US011901650B2

(12) United States Patent
Shinojima et al.

(10) Patent No.: US 11,901,650 B2
(45) Date of Patent: Feb. 13, 2024

(54) ANTENNA DEVICE, WIRELESS TERMINAL, AND WIRELESS MODULE

(71) Applicant: FCNT LIMITED, Yamato (JP)

(72) Inventors: Takahiro Shinojima, Yamato (JP); Yohei Koga, Yamato (JP); Manabu Yoshikawa, Yamato (JP)

(73) Assignee: FCNT LIMITED, Yamato (JP)

( * ) Notice: Subject to any disclaimer, the term of this patent is extended or adjusted under 35 U.S.C. 154(b) by 0 days.

(21) Appl. No.: 18/133,074

(22) Filed: Apr. 11, 2023

(65) Prior Publication Data

US 2023/0282981 A1 Sep. 7, 2023

Related U.S. Application Data

(63) Continuation of application No. PCT/JP2022/008818, filed on Mar. 2, 2022.

(51) Int. Cl.
*H01Q 9/04* (2006.01)
*H01Q 1/48* (2006.01)
(Continued)

(52) U.S. Cl.
CPC ............. *H01Q 9/0414* (2013.01); *H01Q 1/48* (2013.01); *H01Q 1/243* (2013.01); *H01Q 21/08* (2013.01)

(58) Field of Classification Search
CPC .... H01Q 1/243; H01Q 1/38-48; H01Q 21/08; H01Q 9/0407; H01Q 9/0414
See application file for complete search history.

(56) References Cited

U.S. PATENT DOCUMENTS

2009/0066590 A1 3/2009 Yamada et al.
2021/0203071 A1* 7/2021 Lee ...................... H01Q 21/065
(Continued)

FOREIGN PATENT DOCUMENTS

JP H05-259730 A 10/1993
JP 2006-262218 A 9/2006
(Continued)

OTHER PUBLICATIONS

International Search Report dated May 24, 2022, issued in counterpart International Application No. PCT/JP2022/008818 (3 pages).
(Continued)

*Primary Examiner* — Hasan Islam
(74) *Attorney, Agent, or Firm* — WHDA, LLP

(57) ABSTRACT

An antenna device includes a substrate ground having a planar surface, a planar radiation element disposed in parallel and opposite to a planar portion of the substrate ground, a power feeding point connected to the planar radiation element, and a ground portion forming a stacked body in which, on a radiation surface side, ground patterns made of a conductive material are stacked from the radiation surface in a radiation direction perpendicular to the radiation surface. The ground pattern in each of layers of the stacked body is formed inwardly of a portion immediately overlying the ground pattern in another layer located on the radiation surface side, non-ground portions in which the conductive material is not disposed being formed in a portion immediately overlying the radiation surface, and the non-ground portions in the individual layers are formed to be gradually enlarged in the radiation direction.

6 Claims, 17 Drawing Sheets

(51) Int. Cl.
*H01Q 21/08* (2006.01)
*H01Q 1/24* (2006.01)

(56) References Cited

U.S. PATENT DOCUMENTS

2022/0045428 A1* 2/2022 Sudo ........................ H01Q 1/48
2022/0216605 A1* 7/2022 Yamada .................. H01Q 1/48

FOREIGN PATENT DOCUMENTS

JP 2009-081833 A 4/2009
JP 2009-206781 A 9/2009
JP 2014-096742 A 5/2014

OTHER PUBLICATIONS

Written Opinion dated May 24, 2022, issued in counterpart International Application No. PCT/JP2022/008818, with partial English translation (5 pages).
Decision to Grant a Patent dated Sep. 13, 2022, issued in counterpart JP Application No. 2022-546491, with English translation (5 pages).

* cited by examiner

ANTENNA DEVICE, WIRELESS TERMINAL, AND WIRELESS MODULE

CROSS-REFERENCE TO RELATED APPLICATION

This application is a continuation application of International Application PCT/JP2022/008818 filed on Mar. 2, 2022 and designated the U.S., the entire contents of which are incorporated herein by reference.

FIELD

The embodiments discussed herein are related to an antenna device, a wireless terminal, and a wireless module.

BACKGROUND

For wireless devices, various antennas are used (see Patent document 1-2).

[Patent document 1] Japanese Laid-open Patent Publication No. 05-259730

[Patent document 2] Japanese Laid-open Patent Publication No. 2014-96742

SUMMARY

According to an aspect of the embodiments, an antenna device includes a substrate ground having a planar surface, a planar radiation element disposed in parallel and opposite to a planar portion of the substrate ground, a power feeding point connected to the planar radiation element; and a ground portion forming a stacked body in which, on a radiation surface side corresponding to a surface of the planar radiation element that is not opposite to the substrate ground, ground patterns made of a conductive material are stacked from the radiation surface in a radiation direction perpendicular to the radiation surface, when the radiation direction is assumed to be an upward direction, the ground pattern in each of layers of the stacked body being formed inwardly of a portion immediately overlying the ground pattern in another layer located on the radiation surface side, non-ground portions in which the conductive material is not disposed being formed in a portion immediately overlying the radiation surface, and the non-ground portions in the individual layers are formed to be gradually enlarged in the radiation direction.

The object and advantages of the invention will be realized and attained by means of the elements and combinations particularly pointed out in the claims. It is to be understood that both the foregoing general description and the following detailed description are exemplary and explanatory and are not restrictive of the invention.

DESCRIPTION OF EMBODIMENTS

In recent years, an amount of communication over the Internet or the like has continued to increase and, in the field of wireless communication also, high-speed wireless communication is in demand. Accordingly, for smartphones and various other wireless terminals, the use of, e.g., a frequency band of several tens to several hundreds of GHz, which is referred to as a millimeter wave band, is being examined. Since such a frequency band has enormously short wavelengths, antennas can also be miniaturized suitably for miniaturization of wireless terminals.

For millimeter wave band antennas, microstrip antennas (referred to also as patch antennas) are used in most cases. For example, in the case of a quadrilateral microstrip antenna, it is possible to control the directions of radio waves by feeding power in consideration of polarization. In addition, since radio waves in the millimeter wave band have a relatively strong tendency to interfere with each other to strengthen or weaken the waves, when an array antenna in which planar radiation elements are arranged vertically and laterally is used, it is possible to enhance a directionality of the entire antenna and widen a radiation angle. However, in the case of a small-sized wireless terminal that can be carried by a user, it is not easy to ensure a space for arranging the radiation elements vertically and laterally within a casing.

An object of an aspect of disclosed technology is to provide an antenna device, a wireless terminal, and a wireless module each including a planar radiation element with an increased directionality.

Embodiment

A configuration of the following embodiment is exemplary, and disclosed technology is not limited to the configuration of the embodiment.

An antenna device according to the embodiment includes, e.g., the following configuration. Specifically, the antenna device includes a planar radiation element, power feeding points connected to the radiation element, and a ground portion in which the radiation element is placed in an opening portion in a conductive material. The opening portion has an opening shape having an opening width which gradually increases in a radiation direction of a radiation surface of the radiation element.

The antenna device described above allows a directionality of the planar radiation element to be increased. The antenna device described above can be mounted in, e.g., a wireless terminal. Examples of the wireless terminal include a smartphone, a tablet terminal, a wearable computer, a mobile phone, a notebook personal computer, and the like.

Figure 1:
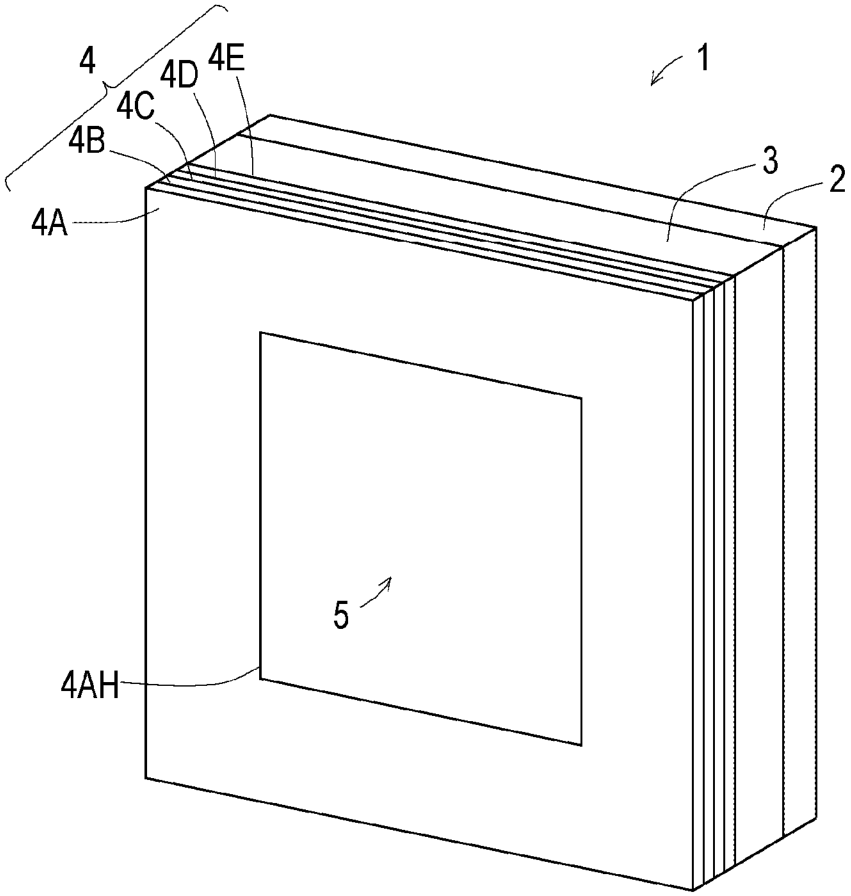
FIG. 1 is an appearance perspective view of an antenna device according to an embodiment.

The following will describe details of the antenna device described above. FIG. 1 is an appearance perspective view of an antenna device according to the embodiment. To present an appearance of an antenna device 1, FIG. 1 illustrates an example of a generally rectangle main portion, but the antenna device 1 is not limited to a form that presents such an appearance. The antenna device 1 may be a part of a wiring substrate of an electronic circuit that controls various processing, or may also be a part of another member. The wiring substrate may be a hard rigid substrate or an elastic flexible substrate.

The antenna device 1 includes a substrate ground 2, a resin 3 stacked on the substrate ground 2, a ground portion 4 formed of ground patterns 4A to 4E stacked on the resin 3, and a ground opening portion 5 formed in the ground portion 4 by a non-ground portion 4AH having an opening shape and formed in the ground pattern 4A and the like. Referring also to drawings of an inner structure of the antenna device 1, a description will be given below of details of the antenna device 1.

Figure 2:
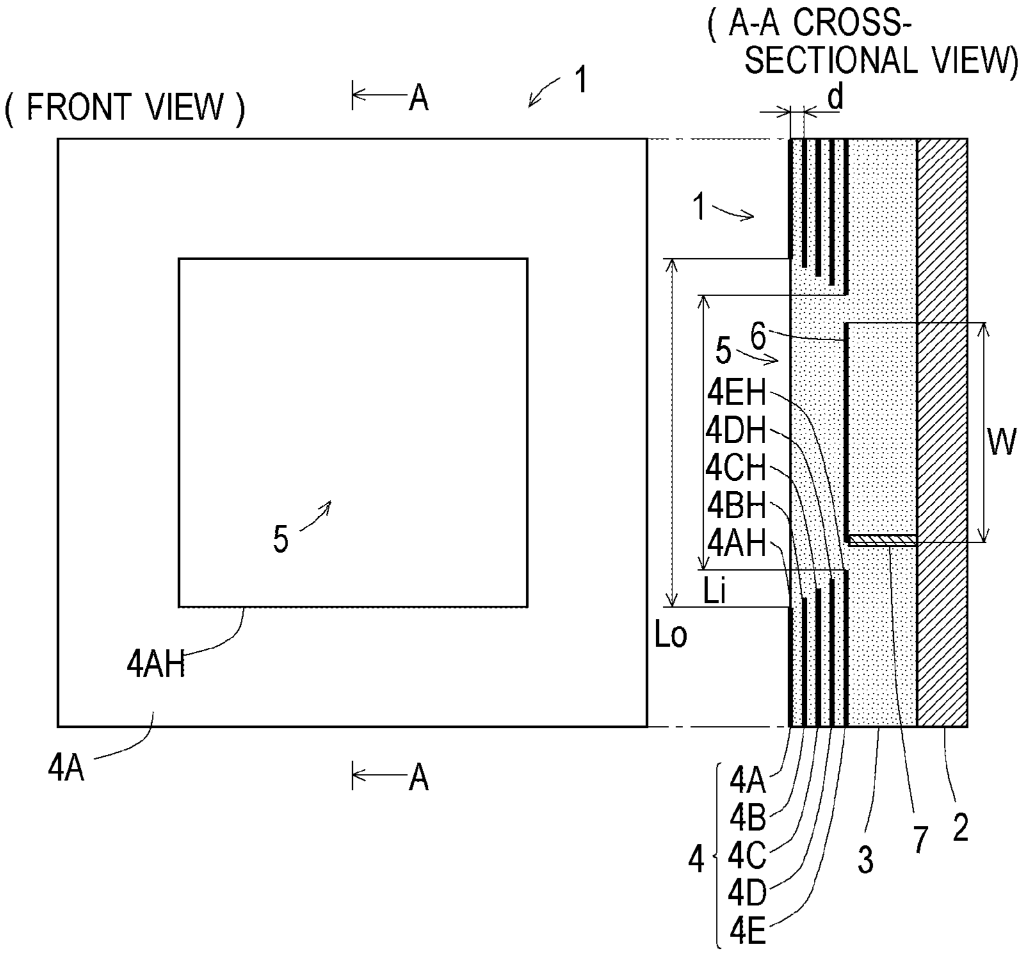
FIG. 2 is a diagram illustrating an inner structure of the antenna device according to the embodiment.
Figure 3:
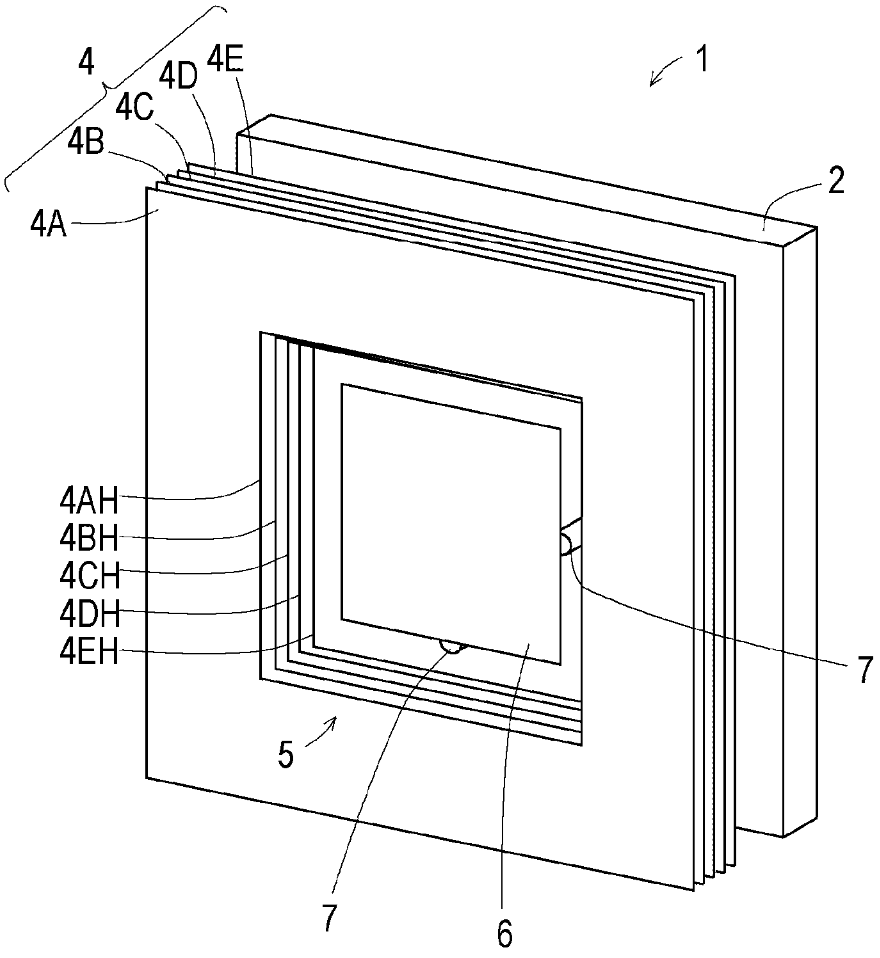
FIG. 3 is a perspective view of the antenna device according to the embodiment in which illustration of a resin is omitted.

FIG. 2 is a diagram illustrating the inner structure of the antenna device 1 according to the embodiment. FIG. 3 is a perspective view of the antenna device 1 according to the embodiment in which illustration of the resin 3 is omitted. FIG. 2 illustrates a diagram illustrating the appearance of the antenna device 1 as viewed from the front and a cross-sectional view when the antenna device 1 is cut along a line denoted by a reference symbol A-A in FIG. 2.

As can be seen from the cross-sectional view in FIG. 2, the ground patterns 4A to 4E are stacked in the resin 3 to be spaced apart from each other at intervals. In addition, in the layer in which the ground pattern 4E is formed, a planar radiation element 6 is also formed in a non-ground portion 4EH of the ground pattern 4E. Thus, the antenna device 1 is in the form of a multilayer substrate in which conductive material layers are stacked on the dielectric resin 3. Examples of the conductive material layers include a copper foil layer. Each of the conductive material layers is conductive to the ground portion of the substrate ground 2 and at the same potential as that of the ground.

The radiation element 6 is a radiation element formed in a square shape (patch shape) in front view of the antenna device 1. The radiation element 6 is connected to a high-frequency circuit of the substrate ground 2 via power feeding points 7. As can be seen from FIG. 3, the antenna device 1 serves as a dual polarized antenna in which the radiation element 6 is provided with the two power feeding points 7. The radiation element 6 emits radio waves in a millimeter wave band that are fed from the high-frequency circuit of the substrate ground 2 via the power feeding points 7 and receives radio waves transmitted from the outside. At the power feeding points 7, appropriate matching circuits may also be provided. For the high-frequency circuit of the substrate ground 2, an appropriate high-pass filter or band-pass filter may also be used.

The radiation element 6 has, in a vertical direction and a lateral direction, such lengths as to allow the antenna device 1 to resonate at a wavelength $\lambda$ of a radio wave at a design frequency which is transmitted/received by the antenna device 1. In other words, the dimensions of the radiation element 6 in the vertical direction and the lateral direction have the lengths obtained by considering, for a positive integral multiple of $\lambda/2$, wavelength shortening due to a dielectric constant of the resin 3.

As can be seen from FIGS. 2 and 3, the antenna device 1 in the present embodiment has a form in which the radiation element 6 is placed in the ground opening portion 5 formed by individual non-ground portions 4AH to 4EH of the ground patterns 4A to 4E of the ground portion 4. The ground opening portion 5 has an opening shape in which, since the non-ground portions 4AH to 4EH of the ground patterns 4A to 4E in the individual layers of the ground portion 4 are gradually enlarged in the radiation direction of the radiation surface of the radiation element 6, the opening width gradually increases in the radiation direction. The ground opening portion 5 has the opening shape that is gradually widened symmetrically with respect to a virtual center axis passing through a center portion of the square radiation surface of the radiation element 6. In addition, since each of the non-ground portions 4AH to 4EH has a square shape, the ground opening portion 5 has the generally square opening shape. Accordingly, the ground opening portion 5 is in a form similar to that of a part of an inverted quadrangular pyramid like that of a bottom portion of a quadrangular pyramid as viewed from the back side. Alternatively, it is also possible to regard the ground opening portion 5 as an opening portion having a tapered or stepwise edge.

In the antenna device 1 in the embodiment described above, the ground opening portion 5 of the ground portion 4 in which the radiation element 6 is placed has the opening shape having the opening width that gradually increases in the radiation direction of the radiation surface of the radiation element 6, and therefore it is possible to increase a directionality of the planar radiation element 6. Since an effect of the opening shape of the ground opening portion 5 has been verified using an electromagnetic field simulator, a description will be given below of details of the verification.

Figure 4:
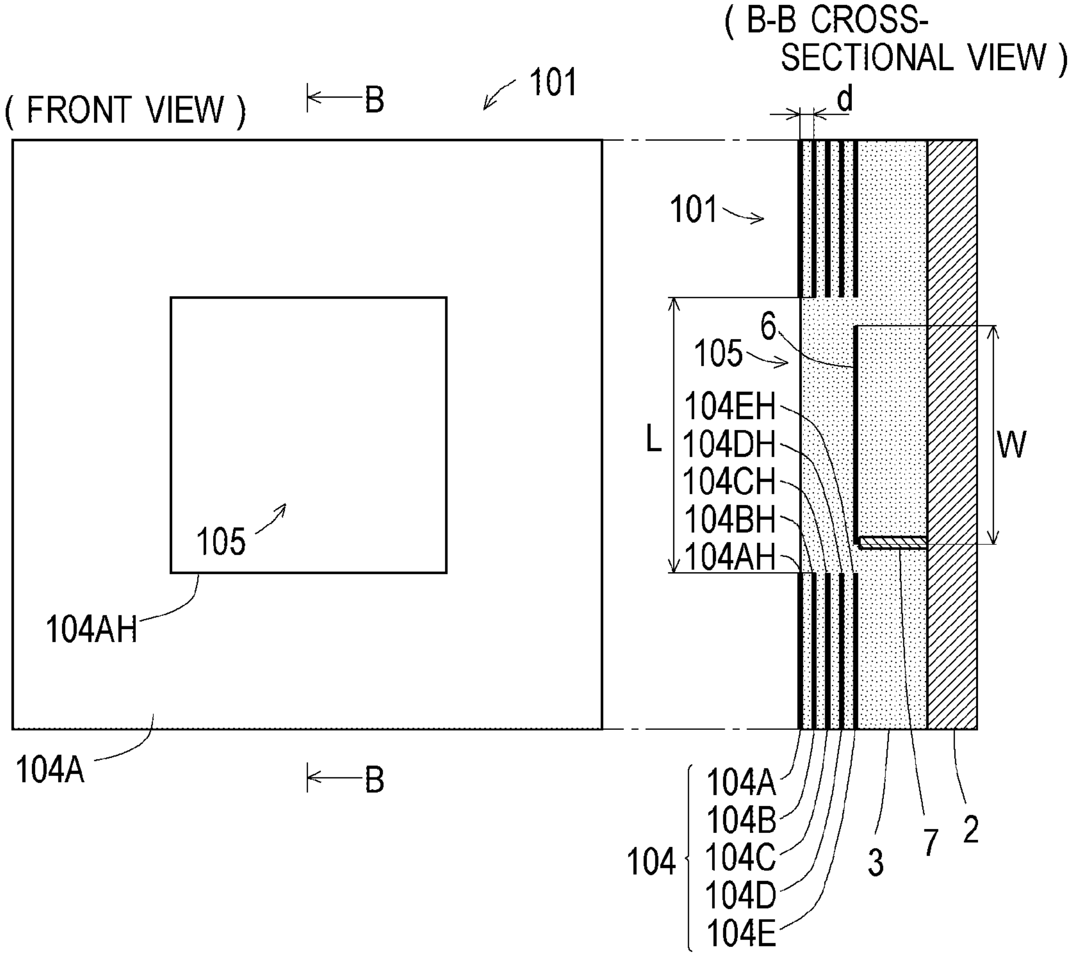
FIG. 4 is a diagram illustrating an inner structure of an antenna device according to a comparative example.
Figure 5:
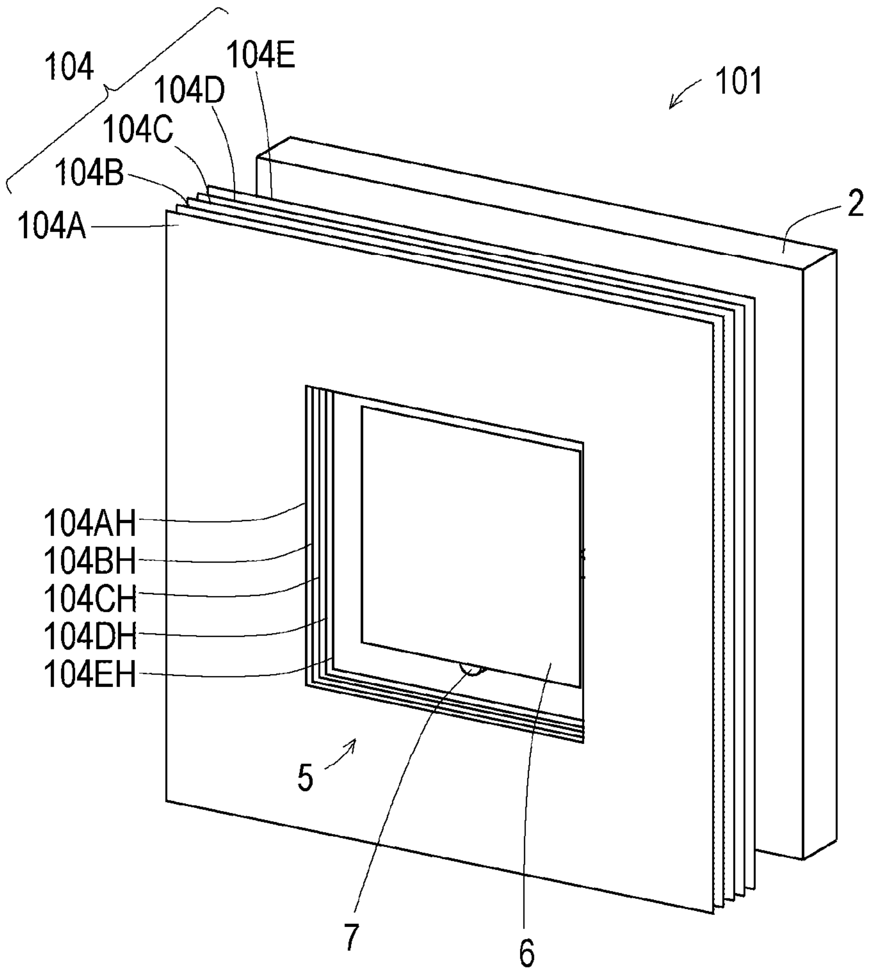
FIG. 5 is a perspective view of the antenna device according to the comparative example in which illustration of a resin is omitted.

In this verification, as a comparative example, an antenna device is prepared by providing the ground opening portion 5 of the antenna device 1 according to the embodiment described above with an opening shape having an opening width which does not gradually increase in the radiation direction of the radiation surface of the radiation element 6. FIG. 4 is a diagram illustrating an inner structure of the antenna device according to the comparative example. FIG. 5 is a perspective view of an antenna device 101 according to the comparative example in which illustration of a resin is omitted. FIG. 4 illustrates a diagram illustrating an appearance of the antenna device 101 as viewed from the front and a cross-sectional view when the antenna device 101 is cut along a line denoted by a reference symbol B-B in FIG. 4. In the antenna device 101 according to the present comparative example, the same components as those of the antenna device 1 according to the embodiment are denoted by the same reference numerals, and a description thereof is omitted.

As can be seen from FIGS. 4 and 5, the antenna device 101 in the comparative example has a form in which, in a ground opening portion 105 formed by individual non-ground portions 104AH to 104EH of ground portions 104A to 104E of a ground portion 104, the radiation element 6 is placed. In the ground opening portion 105, each of the non-ground portions 104AH to 104EH of the ground portions 104A to 104E of the ground portion 104 has the same size. Accordingly, the ground opening portion 105 in the comparative example does not have an opening shape having an opening width which gradually increases in the radiation direction of the radiation surface of the radiation element 6, unlike the ground opening portion 5 in the embodiment, but has an opening shape having an opening width which is constant in the radiation direction of the radiation surface of the radiation element 6.

Conditions in this simulation are as follows (dimensional symbols correspond to those in FIGS. 2 and 4).

Simulation Conditions

Frequency f=38 GHz (Wavelength λ=about 8 mm*)

(* When it is assumed that a dielectric of the resin satisfies Er=4.5, due to a wavelength shortening effect, the wavelength is about 4 mm)

Interval between Ground Patterns d=0.1 mm

Length of One Side of Radiation Element W=2.0 mm

Lengths of One Sides of Non-ground Portions (*1)

*1: It is assumed that lengths of one sides of the non-ground portions in the individual layers in the embodiment are evenly larger from Li to Lo.

Lo (mm)=4.0 mm

Li (mm)=2.4 mm

L (mm)=2.3 mm

Figure 6:
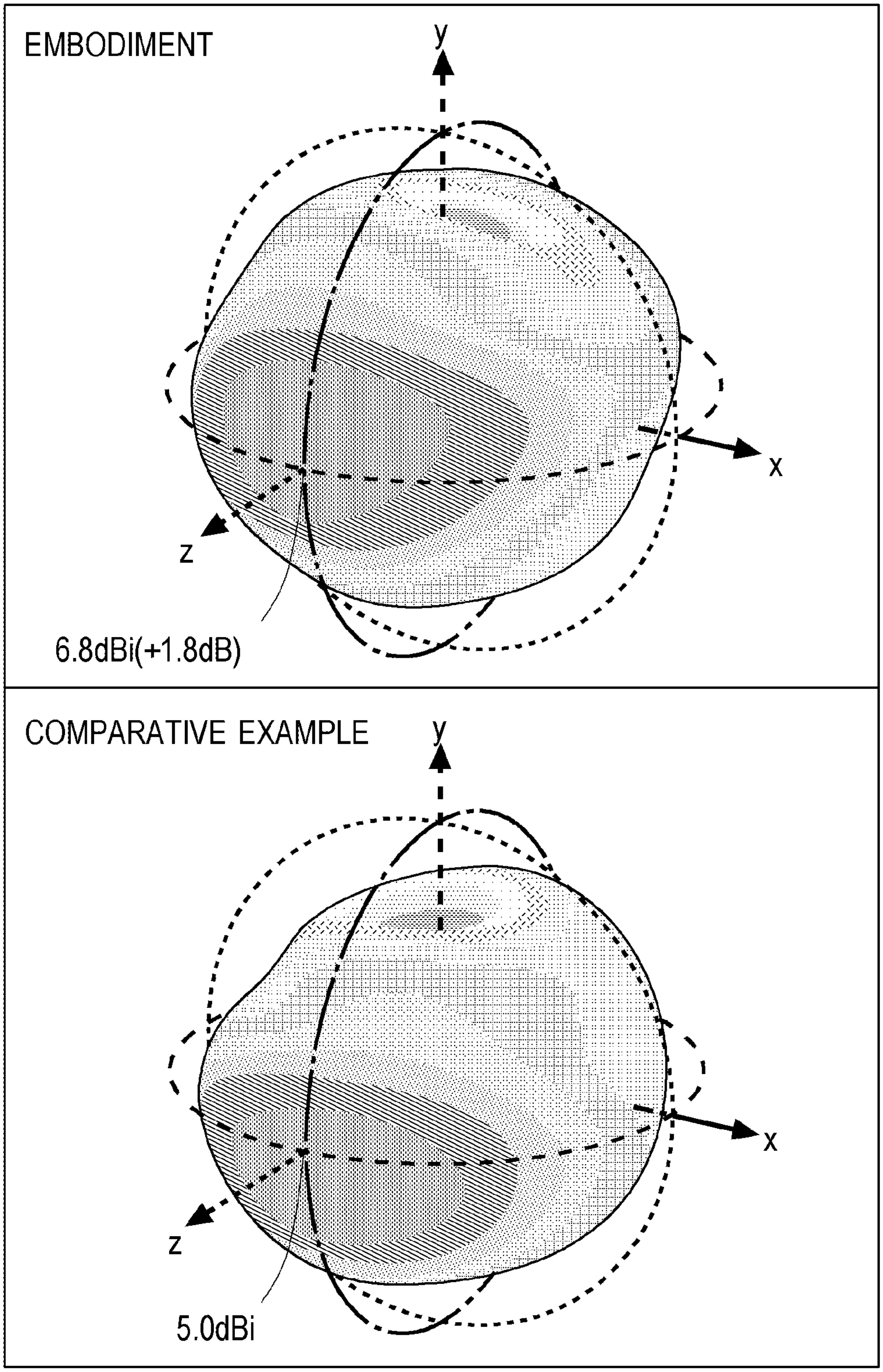
FIG. 6 is a first diagram illustrating a simulation result.

FIG. 6 is a first diagram illustrating a simulation result. In FIG. 6, an X-axis direction corresponds to a lateral direction in each of front views illustrated in FIGS. 2 and 4, a Y-axis direction corresponds to a vertical direction in the front views illustrated in FIGS. 2 and 4, and a Z-axis direction corresponds to a direction perpendicular to each of paper surfaces with the front views illustrated in FIGS. 2 and 4. Accordingly, in FIG. 6, an arrow direction of a Z-axis corresponds to the radiation direction of each of the radiation surfaces of the radiation elements 6 and 106. In addition, grayscale shading display in FIG. 6 represents a gain of the antenna, and a portion with a high gain is represented by dark gray.

As illustrated in FIG. 6, in the antenna device 1 in the embodiment, a gain in the Z-axis direction is 6.8 dBi. Meanwhile, in the antenna device 101 in the comparative example, a gain in the Z-axis direction is 5.0 dBi. In other words, the gain in the Z-axis direction is higher by 1.8 dB in the antenna device 1 in the embodiment than in the antenna device 101 in the comparative example. Therefore, it can be said that the directionality of the radiation element 6 in the antenna device 1 in the embodiment is higher than that of the radiation element 106 in the antenna device 101 in the comparative example.

Figure 7:
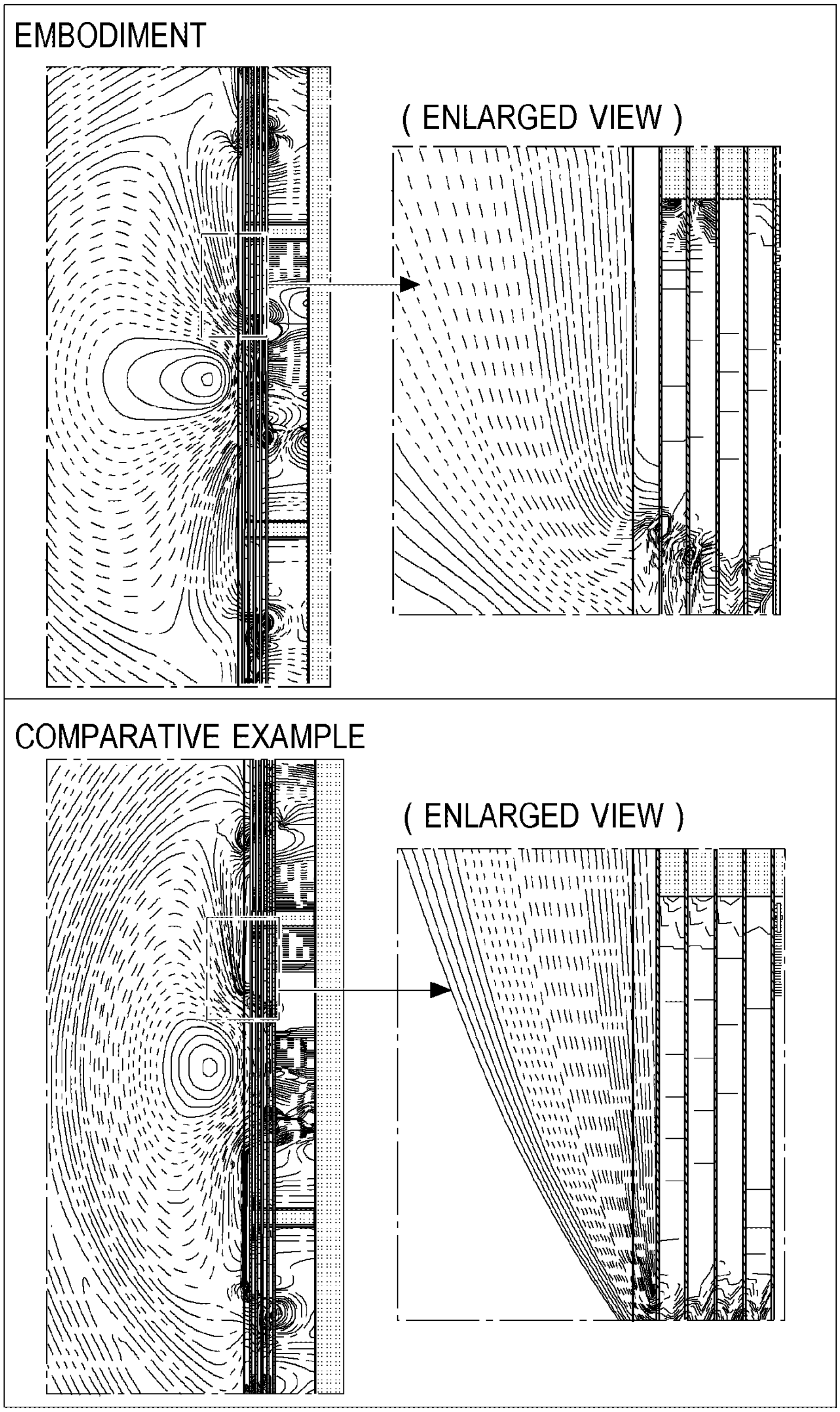
FIG. 7 is a second diagram illustrating a simulation result.
Figure 8:
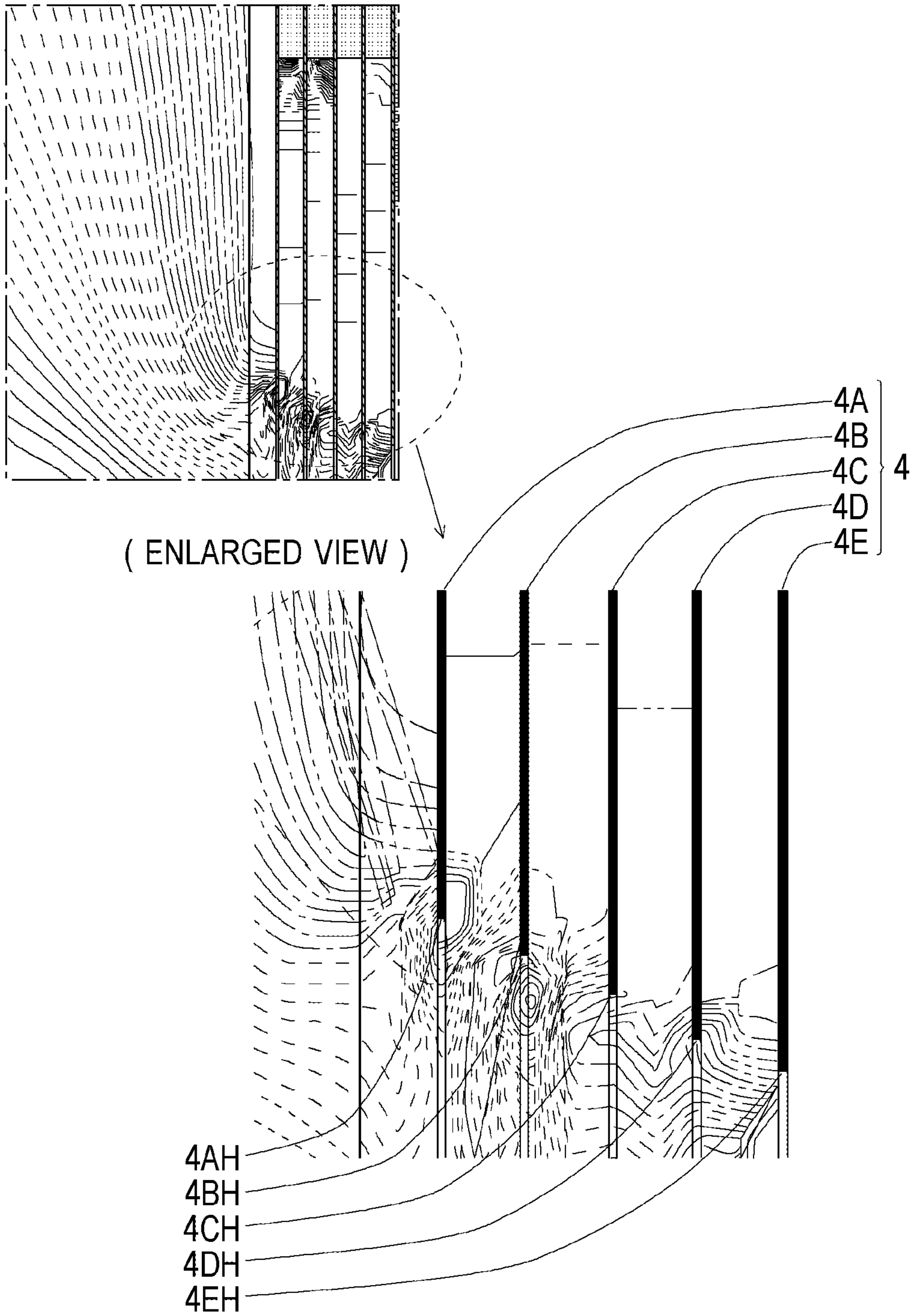
FIG. 8 is a third diagram illustrating a simulation result.
Figure 9:
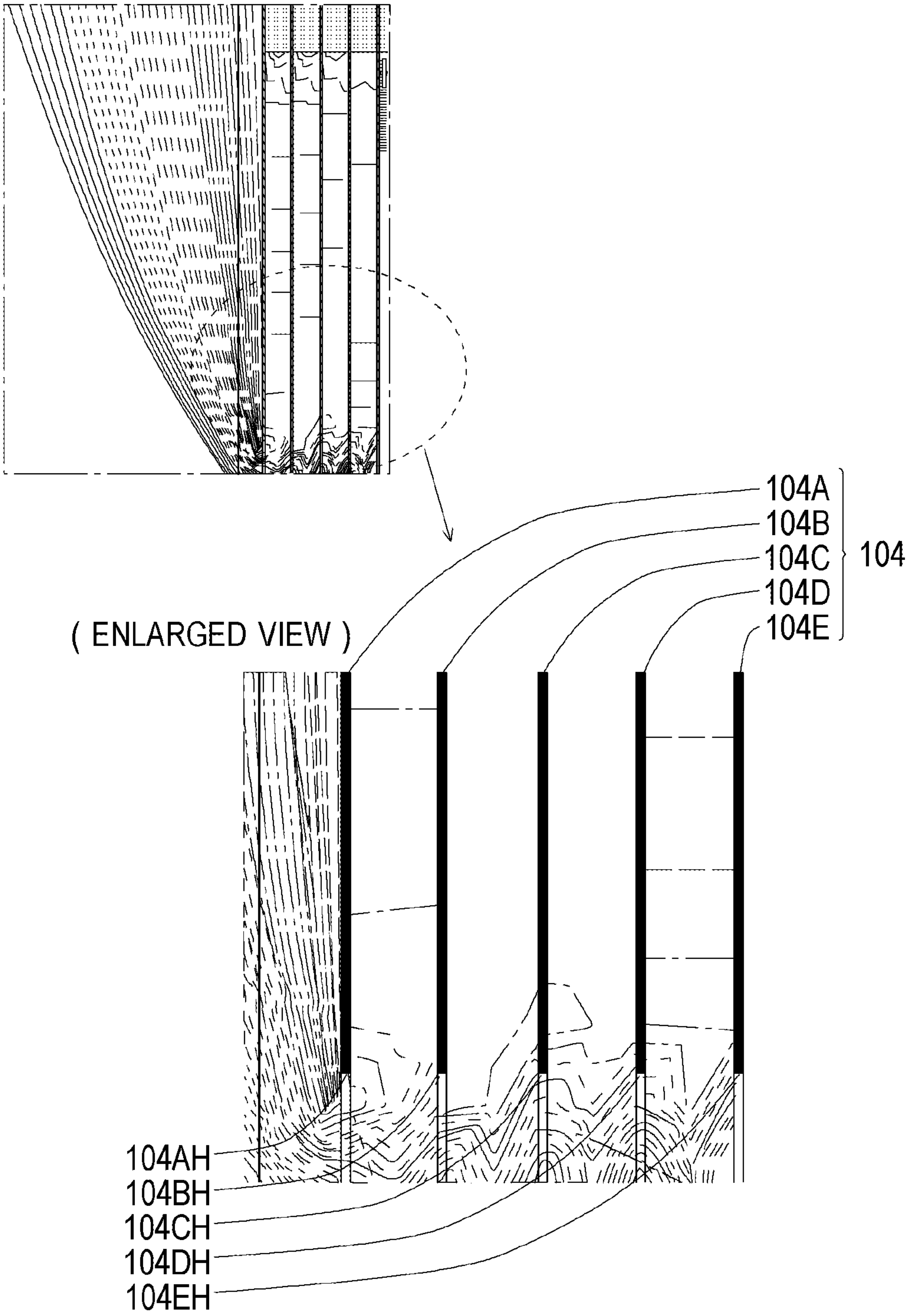
FIG. 9 is a fourth diagram illustrating a simulation result.

A description will be given below of a reason for the directionality that is higher in the antenna device 1 in the embodiment than in the antenna device 101 in the comparative example. FIG. 7 is a second diagram illustrating a simulation result. FIG. 8 is a third diagram illustrating a simulation result. FIG. 9 is a fourth diagram illustrating a simulation result. More specifically, FIG. 7 illustrates, side by side, a contour chart in which a distribution of an electric field intensity when the antenna device 1 in the embodiment is cut along an A-A cross section is represented by contours and a contour chart in which a distribution of an electric field intensity when the antenna device 101 in the comparative example is cut along a B-B cross section is represented by contours. FIG. 8 illustrates an enlarged view in which the vicinity of an edge of the ground opening portion 5 in the contour chart in the embodiment illustrated in FIG. 7 is enlarged to allow a relationship between positions of respective edges of the non-ground portions 4AH to 4EH and the electric field intensity to be recognized. FIG. 9 illustrates an enlarged view in which the vicinity of an edge of the ground opening portion 105 in the contour chart in the comparative example illustrated in FIG. 7 is enlarged to allow a relationship between positions of respective edges of the non-ground portions 104AH to 104EH and the electric field intensity to be recognized.

First, as can be seen from a comparison between the contour chart in the embodiment and the contour chart in the comparative example each illustrated in FIG. 7, the electric field intensity in the radiation direction is higher in the embodiment than in the comparative example. In addition, as can be seen from the portion illustrated in the enlarged view in FIG. 7, a large difference is observed between the respective distributions of the electric field intensities in the vicinity of the respective edges of the ground opening portions 5 and 105. In other words, as can be seen from a comparison between the enlarged view in the embodiment and the enlarged view in the comparative example in FIG. 7, it can be seen that a density of the contours extending laterally to the radiation direction (upward direction over the paper surface with FIG. 7) from the vicinity of the edge of the ground opening portion 5 in the embodiment is lower than that of the contours extending laterally to the radiation direction from the vicinity of the edge of the ground opening portion 105 in the comparative example. In other words, in the vicinities of the edges of the ground opening portions 5 and 105, the electric field in the comparative example is closer to the ground patterns than that in the embodiment. This may be conceivably because, as can be seen from FIG. 8, the edge of the ground opening portion 5 formed of edges of the non-ground portions 4AH to 4EH has a stepwise shape in the embodiment, and accordingly a component of the ground portion 4 (a force of the ground) in the vicinity of the edge of the ground opening portion 5 is weak, and the effect of the ground portion 4 that weakens a component directed in the radiation direction is small. Meanwhile, as can be seen from FIG. 9, in the comparative example, the edge of the ground opening portion 105 formed of edges of the non-ground portions 104AH to 104EH does not have a stepwise shape, and therefore it can be considered that a component of the ground portion 104 (a force of the ground) in the vicinity of the edge of the ground opening portion 105 is strong, and the effect of the ground portion 104 that weakens the component directed in the radiation direction is not small.

Thus, in the antenna device 1 in the embodiment, a feedback of radiated power to the ground portion is reduced compared to that in the antenna device 101 in the comparative example, and therefore it can be considered that the power radiated in a direction (radiation direction) in which the radiation surface of the radiation element 6 faces, i.e., a direction of the front of the radiation element 6 is intensified to improve a peak gain in the radiation direction.

A description will be given below of a modification of the embodiment described above.

Modification of Radiation Element

Figure 10:
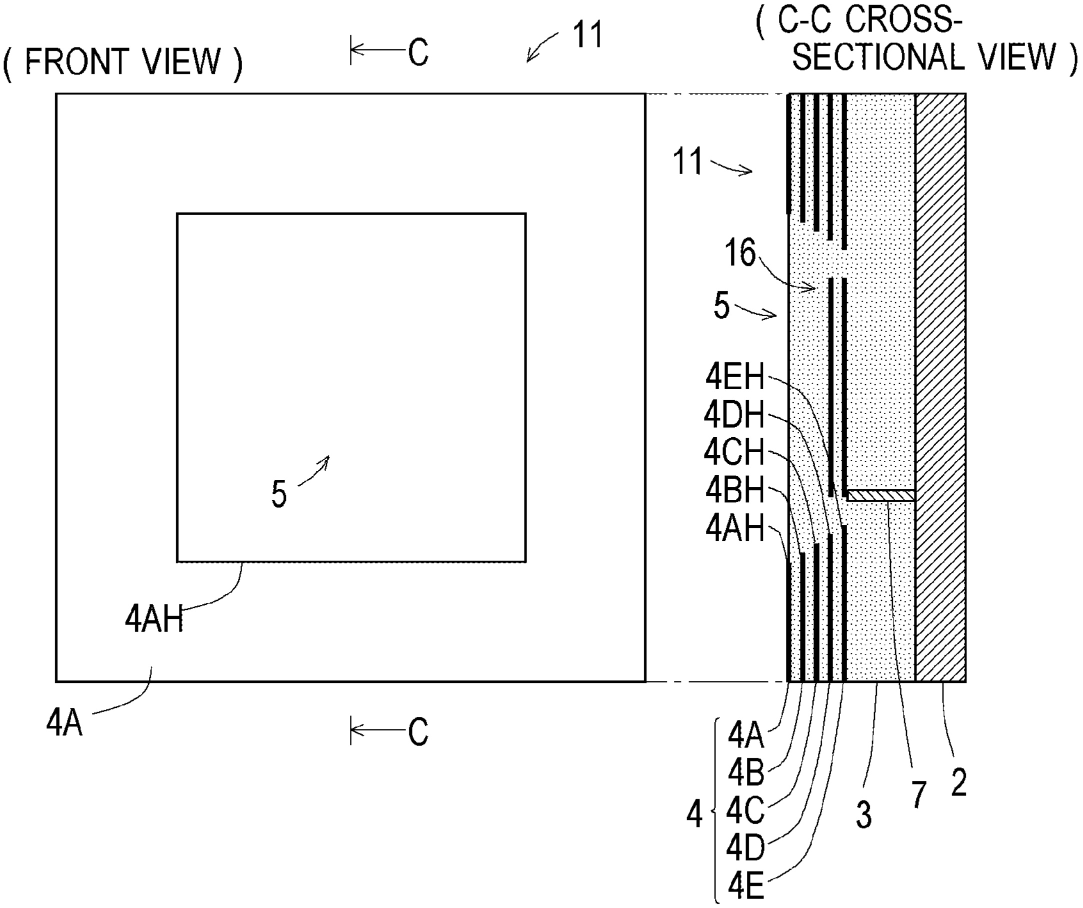
FIG. 10 is a diagram illustrating an inner structure of an antenna device according to a modification.
Figure 11:
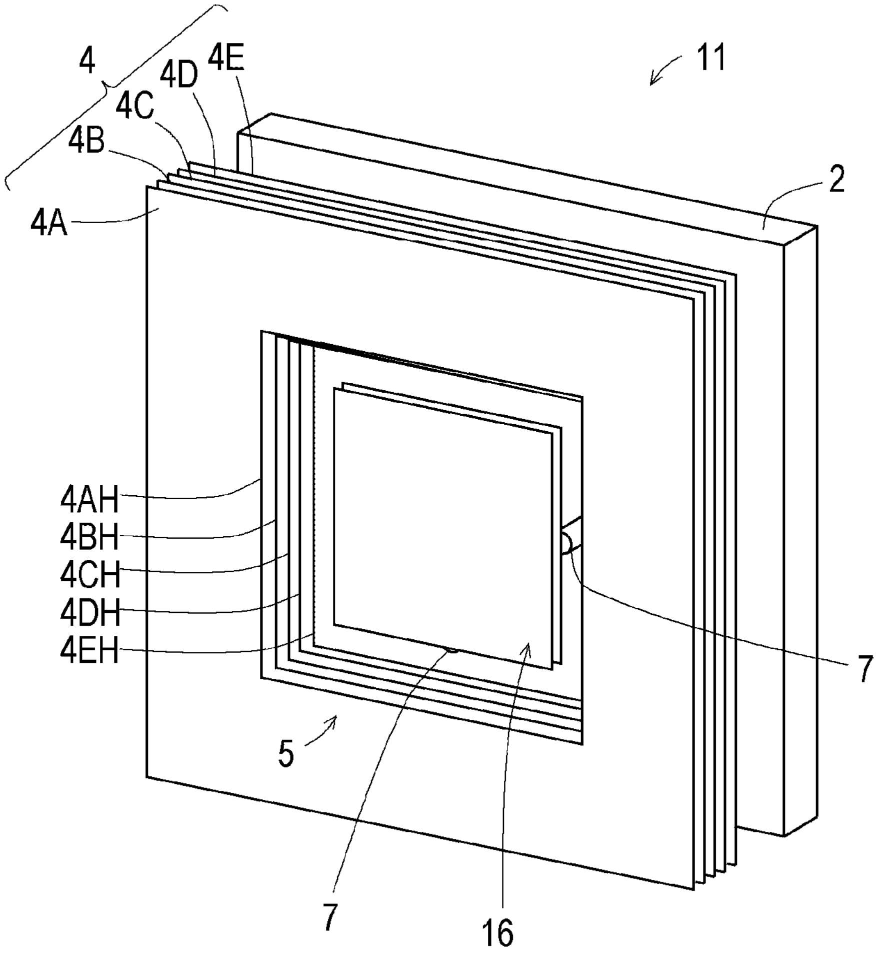
FIG. 11 is a perspective view of the antenna device according to the modification in which illustration of a resin is omitted.

FIG. 10 is a diagram illustrating an inner structure of an antenna device according to the modification. FIG. 11 is a perspective view of an antenna device 11 according to the modification in which illustration of the resin is omitted. FIG. 10 illustrates a diagram illustrating an appearance of the antenna device 11 as viewed from the front and a cross-sectional view when the antenna device 11 is cut along a line denoted by a reference symbol C-C in FIG. 10. In the antenna device 11 according to the present modification, the same components as those of the antenna device 1 according to the embodiment are denoted by the same reference numerals, and a description thereof is omitted.

As can be seen from FIGS. 10 and 11, a radiation element 16 of the antenna device 11 according to the present modification is a radiation element with a stack structure in which two square plate-like conductive materials are stacked via a non-conductive resin. Of the two plate-like conductive materials included in the radiation element 16, the conductive material closer to the substrate ground 2 serves as a radiation element connected to the power feeding point 7, and the conductive material farther away from the substrate ground 2 serves as an unpowered radiation element unconnected to the power feeding point 7. The radiation element 16 described above can be broadened in band or increased in gain compared to the radiation element 6 of the antenna device 1 according to the embodiment described above.

Figure 12:
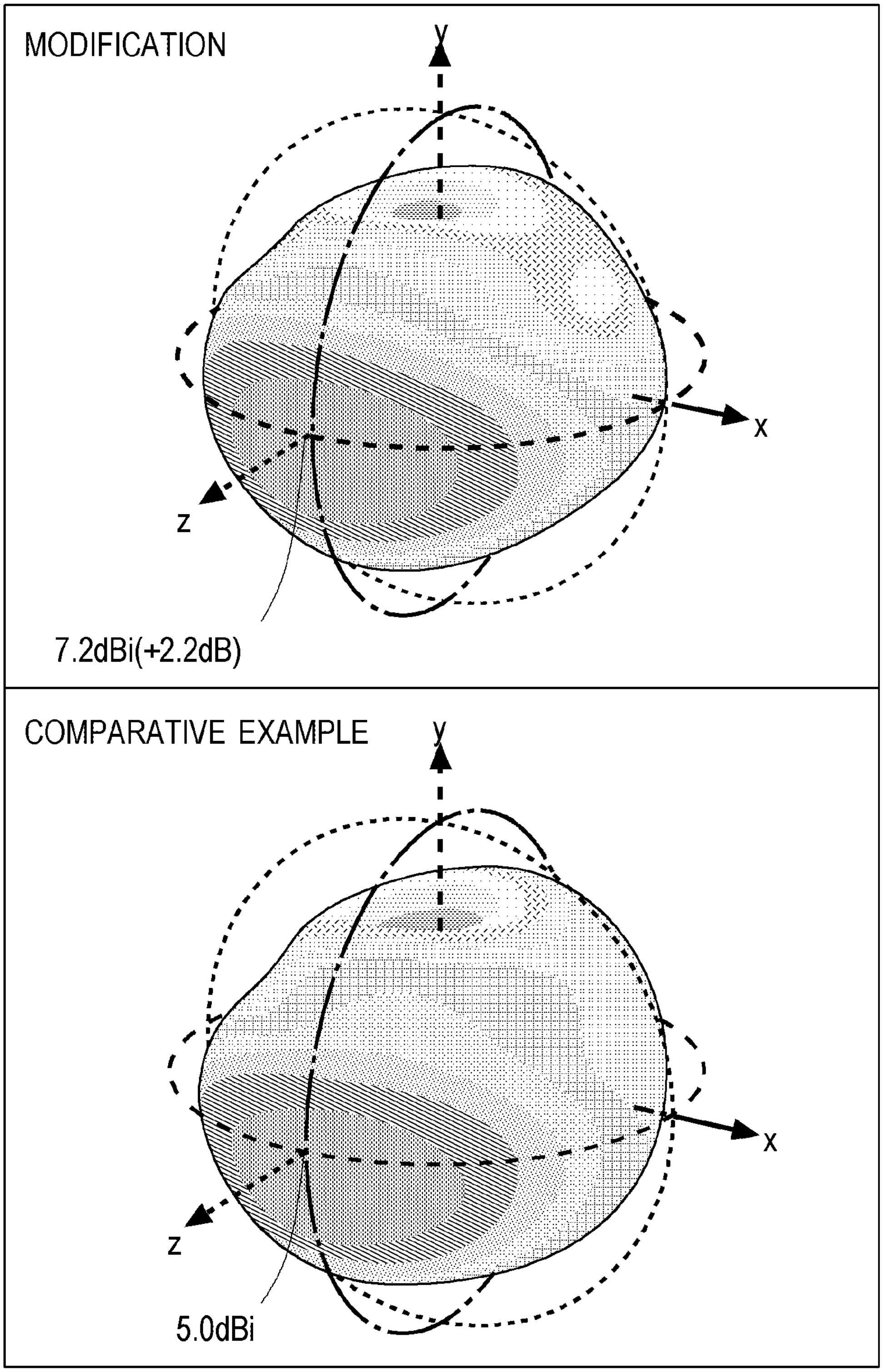
FIG. 12 is a fifth diagram illustrating a simulation result.

FIG. 12 is a fifth diagram illustrating a simulation result. As illustrated in FIG. 12, in the antenna device 11 in the present modification, a gain in the Z-axis direction is 7.2 dBi. By contrast, in the antenna device 101 in the comparative example, as described previously, a gain in the Z-axis direction is 5.0 dBi. In other words, the gain in the Z-axis direction is higher by 2.2 dB in the antenna device 11 in the present modification than in the antenna device 101 in the comparative example. Therefore, it can be said that, in the antenna device 11 in the present modification, the directionality of the radiation element 16 is higher than that in the antenna device 101 in the comparative example.

Modification of Degree of Widening

Figure 13:
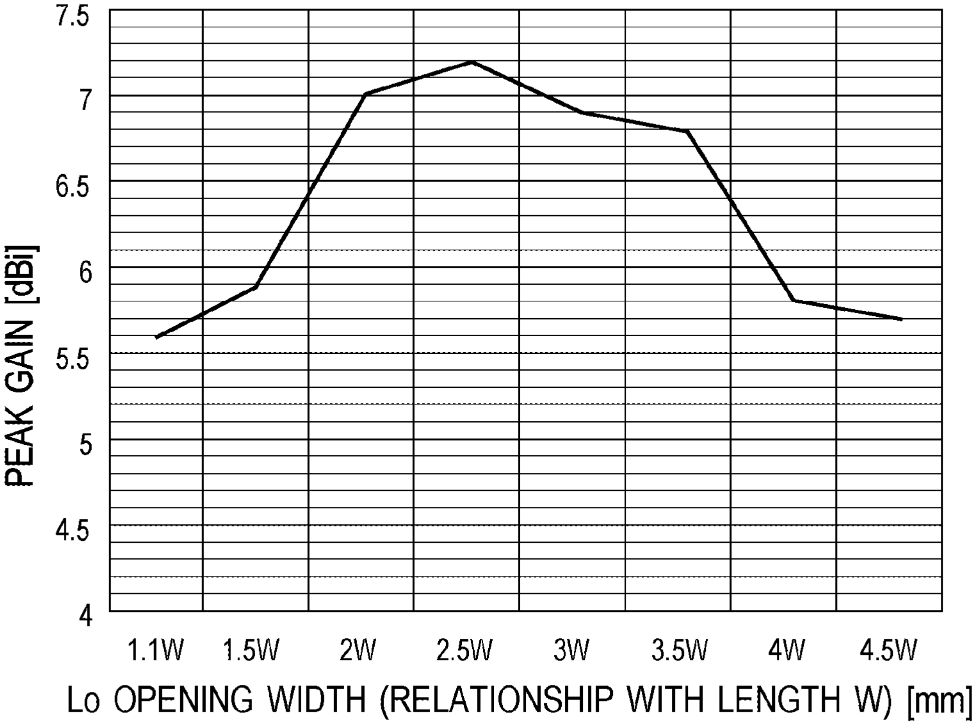
FIG. 13 is a graph illustrating a result of simulating a relationship between a degree of widening of a ground opening portion and a peak gain.

A degree of widening of the ground opening portion 5 in the antenna device 1 according to the embodiment described above may also be modified appropriately. FIG. 13 is a graph illustrating a result of simulating a relationship between the degree of widening of the ground opening portion 5 and the peak gain. An abscissa axis in FIG. 13 represents the dimension denoted by the symbol Lo in FIG. 2 by using the length W of one side of the radiation element. Other conditions are as described in the section "Simulation Conditions" listed above.

As illustrated in the graph in FIG. 13, the peak gain when Lo is between 1.1 W and 1.5 W ranges from 5.6 dBi to 5.9 dBi. When consideration is given to a measurement error of a measurement device that measures an electric field intensity in a real device, which is about 0.8 dB, while Lo is between 1.1 W and 1.5 W, it can be seen that the effect of improving the directionality in the antenna device 1 according to the present embodiment is low. In addition, the peak gain when Lo is between 4.0 W and 4.5 W ranges from 5.7 dBi to 5.8 dBi. Thus, it can also be seen that, when Lo is between 4.0 W and 4.5 W also, the effect of improving the directionality in the antenna device 1 according to the present embodiment is low.

Meanwhile, the peak gain when Lo is between 2.0 W and 3.5 W ranges from 6.8 dBi to 7.2 dBi. Accordingly, it can be seen that, when Lo is between 2.0 W and 3.5 W, the effect of improving the directionality in the antenna device 1 according to the present embodiment is sufficiently achieved. Therefore, it can be said that, in the antenna device 1 in the present embodiment, as long as the following design conditions are followed, when the length Lo of one side of the non-ground portion 4AH is set to any value between 2.0 W and 3.5 W, the effect of improving the directionality is more sufficiently achieved. This may be considerably because, when the degree of widening of the ground opening portion 5 that is widened in the radiation direction is low and the non-ground portion 4AH is narrow, the radiation is interrupted while, conversely, when the degree of widening of the ground opening portion 5 that is widened in the radiation direction is high and the non-ground portion 4AH is excessively wide, the effect of the ground is excessively weakened to increase an impedance fluctuation.

Design Conditions

Frequency f=38 GHz (Wavelength λ=about 8 mm*)

(* When the dielectric of the resin satisfies Er=4.5, due to the wavelength shortening effect, the wavelength is about 4 mm)

Interval between Ground Patterns d=0.1 mm

Length of One Side of Radiation Element W=2.0 mm

Lengths of One Sides of Non-ground Portions (*2)

*2: It is assumed that the lengths of one sides of the non-ground portions in the individual layers are evenly larger from Li to Lo.

Li (mm)=2.4 mm

Modification of Layer Configuration

Figure 14:
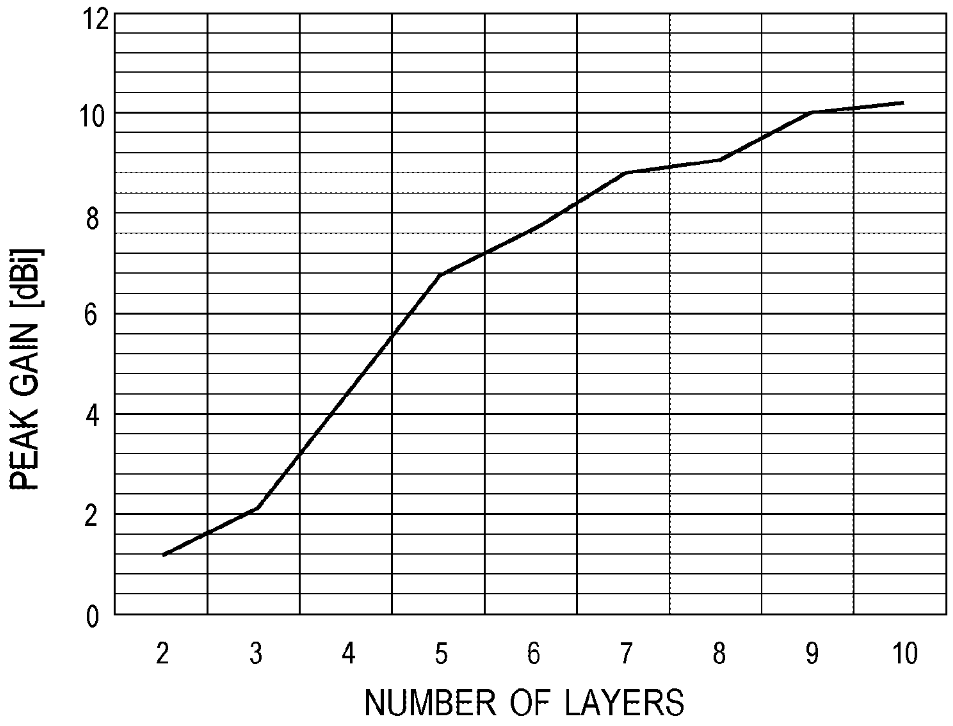
FIG. 14 is a graph illustrating a result of simulating a relationship between the number of layers of ground patterns and the peak gain.

The number of the layers of the ground patterns 4A to 4E in the antenna device 1 according to the embodiment described above may also be appropriately modified. FIG. 14 is a graph illustrating a result of simulating a relationship between the number of the layers of the ground patterns and the peak gain. Conditions other than the number of the layers of the ground patterns are as described in the section "Simulation Conditions" listed above.

As illustrated in the graph in FIG. 14, in the antenna device 1 in the present embodiment, as the number of the layers of the ground patterns increases, the peak gain is improved. However, it can be seen that, when the number of the layers of the ground patterns reaches a number of about 10, the effect of improving the gain is saturated. Accordingly, it can be said that, in the antenna device 1 in the present embodiment, as long as the following design conditions are followed, a reasonable range for the number of the layers of the ground patterns is up to 10.

Design Conditions

Frequency f=38 GHz (Wavelength λ=about 8 mm*)

(* When the dielectric of the resin satisfies Er=4.5, due to the wavelength shortening effect, the wavelength is about 4 mm)

Interval between Ground Patterns d=0.1 mm

Length of One Side of Radiation Element W=2.0 mm

Lengths of One Sides of Non-ground Portions (*3)

*3: It is assumed that the lengths of one sides of the non-ground portions in the individual layers are evenly larger from Li to Lo.

Lo (mm)=4.0 mm

Li (mm)=2.4 mm

Other Modifications

The antenna device 1 and the antenna device 11 can be modified appropriately. For example, the radiation element 6 may also have a circular shape, an ellipsoidal shape, a triangular shape, or a polygonal shape with five or more angles. In this case, the ground opening portion 5 has a shape corresponding to the shape of the radiation element 6.

The ground opening portion 5 is widened in a shape in which respective lengths of all the four sides at an edge of the square shape are evenly increased, but is not limited to this shape. The ground opening portion 5 may also be in, e.g., a form which is widened only in a portion of any one to three sides among the four sides in the radiation direction.

Alternatively, each of the antenna device 1 and the antenna device 11 is not limited to a form disposed as a stand-alone device and, for example, a plurality of the antenna devices 1 or the antenna devices 11 may also be arranged vertically and laterally. An array antenna in which the antenna devices 1 or the antenna devices 11 are arranged vertically and laterally can implement an antenna with a higher directionality.

Figure 15:
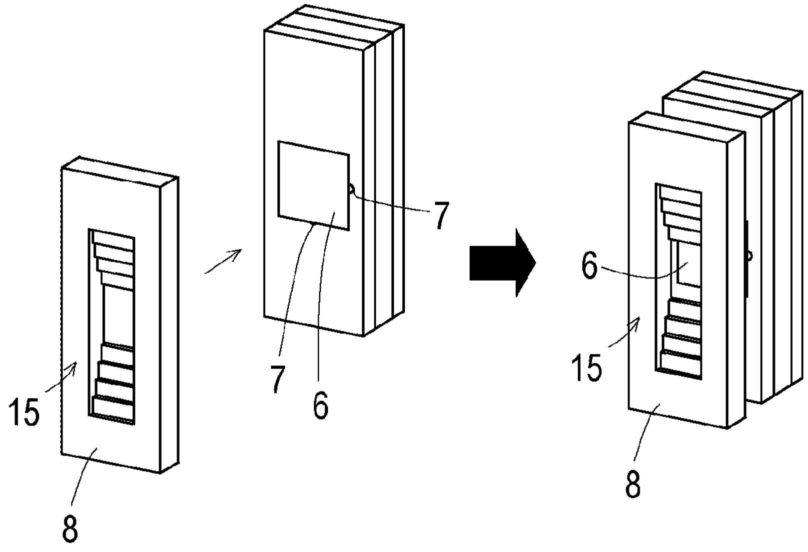
FIG. 15 is a diagram illustrating a metal-worked body obtained by forming the ground opening portion in a metal plate.

Alternatively, the ground opening portion 5 may also be formed in, e.g., a metal plate having a thickness. FIG. 15 is a diagram illustrating a metal-worked body 8 obtained by forming a ground opening portion 15 in a metal plate. Even the ground opening portion 15 formed in the metal plate can increase the directionality of the planar power feeding point 7 in the same manner as in the embodiment and modification described above. The ground opening portion 15 formed in the metal plate can implement not only a form in which an edge portion is formed in a stepwise shape to gradually increase an opening width in the radiation direction, but also a form in which, e.g., the edge portion is formed into an inclined surface to gradually increase the opening width in the radiation direction.

First Application Example

Figure 16:
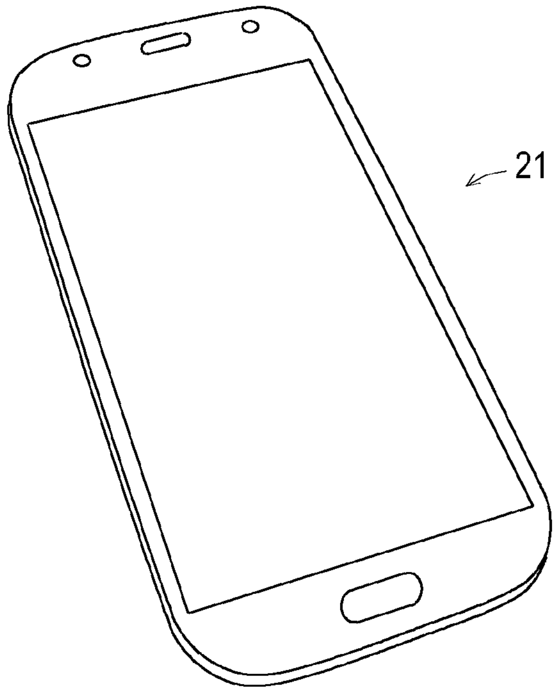
FIG. 16 is a diagram illustrating an example of a smartphone.

The embodiment and modification described above are applicable to various wireless terminals. FIG. 16 is a diagram illustrating an example of a smartphone. For example, the antenna device 1 in the embodiment described above may also be embedded in a smartphone 21 which is a type of a wireless terminal. The smartphone 21 to which the antenna device 1 is applied can perform high-speed wireless communication by using the antenna device 1 with the high directionality.

Second Application Example

Figure 17:
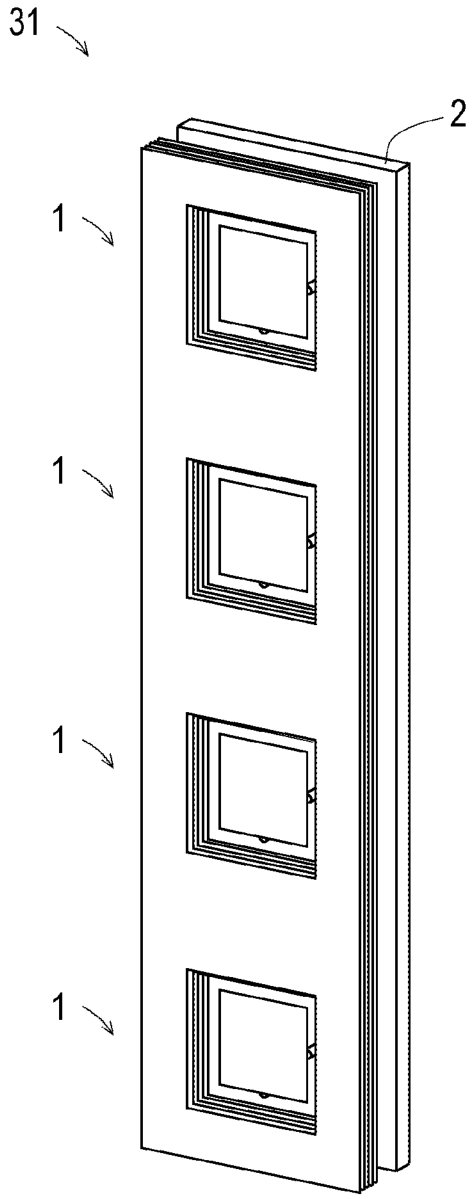
FIG. 17 is a diagram illustrating an example of a wireless module.

The embodiment and modification described above are also applicable to a form of a wireless module in which a plurality of antenna devices are arranged. FIG. 17 is a diagram illustrating an example of the wireless module. FIG. 17 illustrates an example of a wireless module 31 in which the four antenna devices 1 in the embodiment described above each corresponding to the patch antenna are arranged along a vertical direction. In FIG. 17, the illustration of the resin 3 is omitted in the same manner as in FIG. 2. For example, by arranging the plurality of antenna devices 1 in the embodiment described above in the vertical direction, a lateral direction, or a direction corresponding to a combination thereof, it is possible to further increase the directionality. By applying the form in the present second application example and a modification thereof to a communication device, the communication device can perform high-speed communication by using the antenna with the higher directionality.

The disclosed technology can increase a directionality of a planar radiation element.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An antenna device comprising:

a substrate ground having a planar surface;

a planar radiation element disposed in parallel and opposite to a planar portion of the substrate ground;

a power feeding point connected to the planar radiation element; and a ground portion forming a stacked body in which, on a radiation surface side corresponding to a surface of the planar radiation element that is not opposite to the substrate ground, ground patterns made of a conductive material are stacked from the radiation surface in a radiation direction perpendicular to the radiation surface, wherein when the radiation direction is assumed to be an upward direction, a respective ground pattern in each layer of the stacked body being formed inwardly of a first portion immediately overlying the ground pattern in another layer located on the radiation surface side, wherein non-ground portions in which the conductive material is not disposed being formed in a second portion immediately overlying the radiation surface, and wherein the non-ground portions in respective layers are formed to be gradually enlarged in the radiation direction.

2. The antenna device according to claim 1, wherein the non-ground portions are portions each having an opening shape and formed in the ground patterns, and wherein the ground portion has an opening portion having an opening width which gradually increases as the non-ground portions in the individual layers are gradually enlarged in the radiation direction.

3. The antenna device according to claim 2, wherein the planar radiation element has the square radiation surface, and wherein each of the non-ground portions has a square opening shape.

4. The antenna device according to claim 1, wherein the non-ground portions in the individual layers are formed to be enlarged in the radiation direction and symmetrically with respect to a virtual center axis passing through a center portion of the radiation surface.

5. A wireless terminal comprising:

the antenna device according to claim 1; and a casing in which the antenna device is embedded.

6. A wireless module comprising:

a plurality of the antenna devices according to claim 1 that are arranged.

* * * * *